Dec. 9, 1969   W. J. CAIRNS ET AL   3,483,069
POLYURETHANE FOAM REINFORCED FIBROUS ARTICLE
AND METHOD OF FORMING THE SAME
Filed Aug. 23, 1965

INVENTORS
WALTER J. CAIRNS
RICHARD S. LINDSTROM
BY
Robert J. Schiller
ATTORNEY

United States Patent Office 3,483,069
Patented Dec. 9, 1969

3,483,069
POLYURETHANE FOAM REINFORCED FIBROUS ARTICLE AND METHOD OF FORMING THE SAME
Walter J. Cairns, Marblehead, and Richard S. Lindstrom, Reading, Mass., assignors to Arthur D. Little Inc., Cambridge, Mass., a corporation of Massachusetts
Filed Aug. 23, 1965, Ser. No. 481,649
Int. Cl. B32b 5/28
U.S. Cl. 161—59                 6 Claims

ABSTRACT OF THE DISCLOSURE

There is disclosed a reinforced foamed, synthetic polymeric plastic material formed of polyurethane foam with a network of fibers, initially unbonded to one another uniformly distributed therein. The fibers range in diameter from about 0.001 to 0.005 inch and are larger than 2 inches. The material may be used per se, or compressed to less than 25% of its original thickness and heat set in compressed form to provide a strong, yet porous sheet material.

---

This invention relates to sheet materials of reinforced plastic foam and, more particularly, to sheets of polyurethane foam having filamentary reinforcing elements distributed substantially uniformally throughout the body of the sheet.

Figure 1:
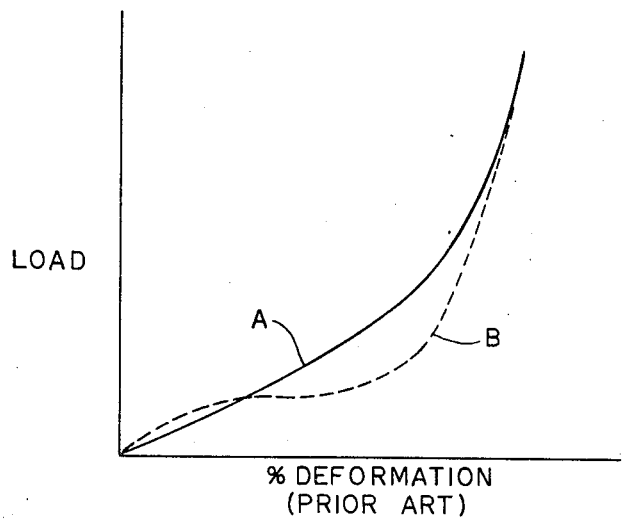

Foamed plastics have found a variety of uses. Particularly, resilient or flexible foams have been employed for their physical attributes such as their thermal, electrical and shock absorbent qualities. Specifically, a common use is as load-bearing pads, such as mattresses, seat-cushions, and the like. Such cushions when made of rubber latex foam frequently will exhibit compressive deformation under load in a manner which can be described as quadratic and as shown in the exemplary curve denoted A in FIG. 1. For a number of reasons well known in the art, such as better aging characteristics, friability and the like, foams formed of synthetic polymeric materials, such as polyurethane, are preferred over rubber foams for specific applications. However, as load-bearing pads, flexible polyurethane foams differ from rubber foams in tending to show "bottoming" characteristics under load i.e. the compressive deformation increases approximately linearly with each increment of load until a critical range is reached at which a load increment causes a much larger change in the deformation than previously. At the end of the range, the deformation change becomes much smaller with each load increment, approaching substantially zero in the limit. A typical curve of this behavior, a cubic function, is shown in FIG. 1 as curve B. This bottoming characteristic of flexible urethane foam is quite undesirable. For example, a mattress of polyurethane foam is acceptable largely because the load per unit area imposed by a recumbent person usually does not result in deformations in the critical range. However, if the person should load that mattress centrally by sitting on it, frequently the increased load per unit area causes a deformation extended into the critical range. The mattress compresses or "collapses" extensively under the person, and the ends of the mattress tend to rise up. The same collapse is often found to occur with polyurethane seat cushions.

Open-cell, foamed flexible polyurethane foam pads have been also used, as described in U.S. Patent No. 3,050,432 issued to E. Weinbrenner et al., to produce leather-like sheet materials. As described in the patent, such pads, if compressed not beyond a point at which the cellular voids are completely destroyed, are set in that condition and are believed to retain sufficient porosity to be at least previous to water vapor but not to liquid water. Such sheet materials have little tear strength and it has, therefore, been suggested that the compressed set sheet be strengthened by laminating it with one or more fabric layers. Such laminates, of course, are limited by the elastic deformability of the fabric and do not lend themselves as does leather, to being shaped easily upon a form such as a shoe last.

One object of the present invention is to provide a readily compressible, foamed, flexible polyurethane pad which exhibits markedly reduced bottoming characteristics and improved load-bearing properties. Another object of the present invention is to provide a novel method for producing such pads. Yet other objects of the invention are to provide a porous polyurethane sheet material of superior tear strength and leather-like deformability; to provide such a sheet material which is substantially uniformly reinforced throughout the body of the material without the use of laminates as a necessary part thereof to maintain high tear strength; and to provide a novel method for producing such sheet materials.

Yet another object of the present invention is to provide a method for producing such sheet materials shaped in a predetermined manner about a form.

Other objects of the invention will in part be obvious and will in part appear hereinafter. The invention accordingly comprises the several steps and the relation of one or more of such steps with respect to each of the others and comprises the product possessing the features, properties and relation of components which are all exemplified in the following detailed disclosure, and the scope of the application of which will be indicated in the claims.

Figure 2:
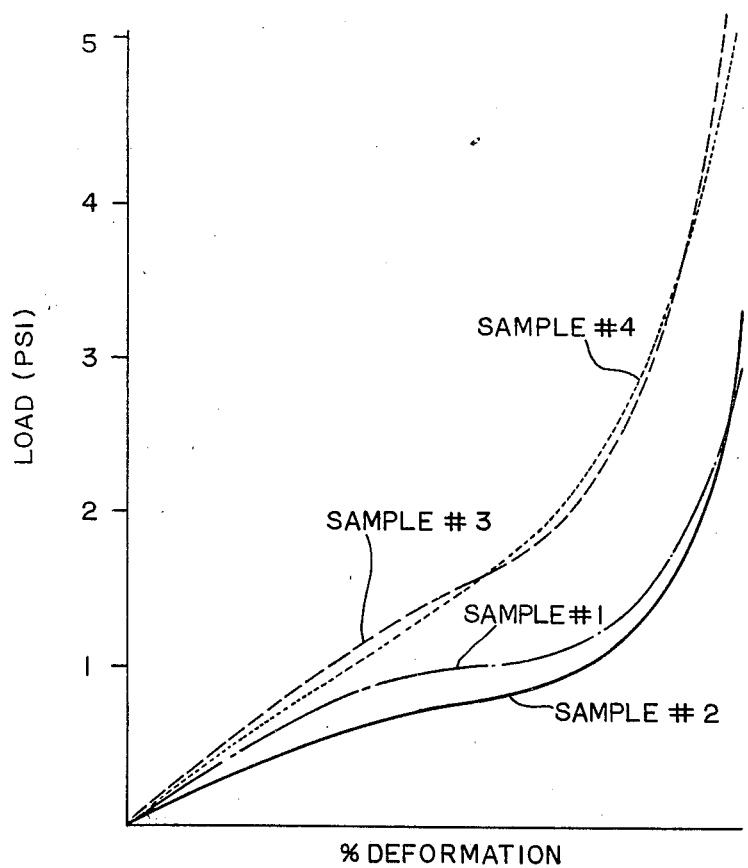

For a fuller understanding of the nature and objects of the present invention, reference should be had to the following detailed description taken in connection with the accompanying drawing wherein:

FIG. 1 is a load-deformation graph of exemplary characteristics of prior art, and FIG. 2 is a load-deformation graph showing behavior of a product of the present invention relative to prior art.

In accordance with the present invention, the pad is formed from a fibrous bat consisting of one or more layers of long carded fibers characterized in having minimal mechanical interengagement i.e. they are substantially non-contiguous. The term "carded" as used herein is intended to mean that the fibers are substantially aligned in parallel array, and is not to be construed as limited to the formation of such array by mechanical carding only. Because the fibers of each layer and of adjacent layers (if any) are non-contiguous nor are they bonded to one another, they are relatively free to move independentally of one another compared, for example, with bats or fibrous materials wherein the fibers are coupled as by adhesives or by mechanical interbonding of rough or scaled surfaces, as is disclosed in U.S. Patent 2,972,554 issued to I. E. Muskat et al.

The fibrous bat is impregnated with a foamable, polymerizable, urethane liquid composition, as by lightly kneading the resin into the bat or preferably by reducing gas pressure on one side of the bat and allowing the liquid to be forced into the bat by atmospheric pressure until the bat is saturated, i.e. the bat is wetted with the liquid resin as fully as possible. The resin filled bat is then allowed to foam and the expansion of the foam carries the movable fibers with it such that when foaming is complete, the fibers form a matrix in which the non-contiguous fibers are dispersed by substantially uniform increments throughout the bat. The bonding between fibers is now substantially only provided by the polymerized foam. If the distribution in density of the fibers in the original unexpanded bat is substantially uniform, the dispersion of the fibers by the expanding foam only changes their relative spacing and the resulting pad has the same substantial uniformity of distribution density of the fibers. Typically, a mixture of resin and foaming catalyst is distributed through the bat until the latter is saturated. This can be achieved before substantial foaming occurs. Complete foaming and expansion to a set condition occurs within minutes.

The resulting pad or bun, depending on the fiber percentage, dimensions, and type shows varying deformation characteristics under load; however, in each instance such deformation characteristics are improved over unreinforced polyurethane foams with respect to "bottoming" response.

The cellular structure of the pad or bun appears to be largely closed initially, but if the pad is crushed as between a pair of rollers and allowed to return to approximately its original thickness due to its resiliency, the cellular structure will now be found to be more open, i.e. substantially intercommunicative or porous, due to breakage apparently of some of the very thin intercellular walls.

Some of the buns can be further processed according to the present invention as by compressing them into sheets having cellules or voids of reduced volume and by then setting the sheets in compressed form, for example, by heating to a temperature at which permanent plastic deformation will occur. The compression and temperature applied to the bun is limited preferably to amounts sufficient to reduce the thickness of the bun without destroying its porosity, i.e. as much as to 8 percent of its original thickness, and of course require a fiber of small enough diameter to permit the desired compression. The consequence of this compression and heat-setting in the compressed state, is a sheet material having excellent water vapor transmission characteristics similar to leather and high tensile strength.

The cellular polyurethane foams are preferably made from polyesters (or polyethers), diisocyanates and water, the nature of the polyester largely determining the mechanical characteristics of the foam. Generally, the diisocyanate is reacted with the liquid polyester polymer to provide a high molecular weight elastomeric material. The reaction between the water and diisocyanate generates carbon dioxide which foams the other reactants. Alternatively, water need not be present if foaming is achieved by blowing agents such as dichlorodifluoromethane. The materials, conditions, and variants thereof to produce resilient or flexible foams are well known and typically described in Modern Plastics Encyclopedia for 1964, vol. 41, No. 1A of September 1964, New York, in pages 197–198, 346–350.

The fibers used in the present invention are preferably long fibers, i.e. greater than one inch, laid parallel to one another as by carding, in each layer of the bat. To provide minimal interengagement between adjacent fibers, not only are they carded, but the fibers are preferably of materials having a smooth surface with low coefficients of friction, The fibers are preferably monofilaments of synthetic polymeric materials such as nylon, "Dacron" brand of polyester, various rayons such as cuprammonium acetate, polyvinyl chloride, and the like. Other fibers can be used such as natural fibers, e.g. silk, cotton or the like in the form of spun yarns. Fiber diameters can range from 15 denier nylon (i.e. about 0.001 inch diameter) up to 0.02 inch diameter bristle for making pads. Fiber concentrations by weight in the foamed bun can range from as low as 2.5 percent up to 15 percent without drastically affecting foam density with, however, corresponding variations in tensile strength and compression-deflection characteristics.

In forming a bun from the bat and polyurethane, only a single layer or web of carded fibers need be used, but the product will exhibit anisotropic tensile strength, being greatest in the direction of the lay of the fibers. If more than a single web is employed in a stacked array, the lay of the fibers of one web should be angularly disposed to the lay of the fibers of an adjacent layer or web. Thus, if a number of adjacent layers are used, the tensile strength of the bun will be substantially the same in any direction within the planes of the layers. If the bun having multiple webs as above described is compressed and set in compressed condition, there is provided a sheet material having relatively uniform high tensile strength in all directions along its surface. The fiber diameter is preferably only a few thousands of an inch (e.g. 0.001 to 0.005), and the fibers have high tensile strength (e.g. similar to nylon or the like) to permit high compression ratios to be achieved. The pressures and temperatures used to compress and set a bun are variable. Preferably, depending on the density, thickness, and porosity of the sheet material desired, pressures can vary from 200 to 1000 p.s.i. and temperatures from about 300° F. to 350° F. for compression periods of 1 minute to 4 minutes. In order to insure that the sheet material produced will have the desired porosity, it is preferred to skive the bun surfaces to remove imporous skin usually formed in the foaming process. Alternatively, the bun as originally formed can be provided with porous surfaces by known methods for controlling its formation, as by foaming in a properly heated mold. In yet another variation to provide buns having porous surfaces, it is economically advantageous to first form very thick buns and cut such thick buns into multiple layers. In such event, only the two "outside" layers might have a relatively imporous surface such as would require skiving. The bun need not be precrushed to insure formation of same open cell structures inasmuch as the compression step provides the desired breakdown of intercellular walls. Sheet materials produced from fiber reinforced pads of the invention showed unexpected enhancement of water vapor transmission for some of the denser, more highly compacted sheets than was found in similarly compressed, unreinforced foams. Because buns or pads formed according to the invention possess a non-bonded (except for the polyurethane itself) fibrous matrix, they are readily elastically deformable. In addition, because they are formed from an easily draped fibrous web, they can be formed in a variety of shapes, i.e. foamed around a form. Thus, in one aspect of the invention a pad is deformed to fit about a form, or alternatively formed in situ about the form as by draping the fiber bat about the form and expanding it with polyurethane foam. The bun thus produced is then compressed and set to produce a unitary formed-sheet structure such as an entire shoe upper in a single process. The following examples are illustrative of the processes and products of the present invention.

EXAMPLE I

A polyurethane mixture was formulated as follows:

|  | Grams |
|---|---|
| Polyethertriol (Union Carbide "LG–56") | 100.00 |
| Silicone fluid (Union Carbide "L–520") | 1.25 |
| Tertiary amine catalyst (Houdry Process Co., "Dabco") | 0.15 |

|                                                    | Grams |
|----------------------------------------------------|-------|
| Metal type catalyst (Metal & Thermite Co., "T-9")  | 0.25  |
| Water                                              | 2.25  |
| Isocyanate (Du Pont Co.)                           | 32.2  |

The liquid was immediately used to saturate a low density, non-woven, loosely laid bat about 2 inches thick, of open-carded, 15 denier, 4½ long monofilament nylon fiber and allowed to foam. The foam set in approximately 2–3 minutes and the pad formed was then cured in an oven at 140° C. for 1 hour.

Upon cutting transversely across the pad, it was found that the foaming had caused expansion of the bat fiber structure with substantially uniform dispersion of the fibers through the pad.

By varying fiber to urethane mix ratio, various percentages by weight of fiber were incorporated in a number of pads. The following chart indicates the characteristics of these pads compared to control pads formed from the polyurethane mixture without any fiber content, the compressive strength or load being expressed in pounds per square inch, and the deformation being shown as percentage compression.

|  | Fiber content | Density in lbs./cu. ft. | Load (p.s.i.) At Various Compression Percentages | | | | |
|---|---|---|---|---|---|---|---|
|  |  |  | 25% | 50% | 60% | 70% | 75% |
| Sample: |  |  |  |  |  |  |  |
| #1 | No fiber | 2.67 | 0.82 | 1.04 | 1.35 | 2.05 | 2.95 |
| #2 | do | 4.20 | 0.57 | 0.90 | 1.22 | 2.13 | 3.28 |
| #3 | 5% Nylon | 3.04 | 1.02 | 1.80 | 2.54 | 4.22 | (¹) |
| #4 | 10% Nylon | 2.91 | 0.98 | 1.89 | 2.64 | 4.18 | (¹) |

¹ Off scale.

The above data, graphically illustrated in FIG. 2 shows clearly that the fiber reinforced pads of the present invention exhibits considerably less "bottoming" than unreinforced flexible pads.

EXAMPLE II

With the polyurethane formula of Example I, a pad was similarly formed using at bat of 0.02" diameter nylon fibers of about 2" length as 10% by weight thereof in a carded arrangement. A cut across the pad again indicated that the foaming had expanded the original bat and provided substantial uniform fiber distribution throughout the pad. The pad, having a density of 2.0 lbs./cu. ft., exhibited, compressive strength in (lbs./square inch) at various deformation percentages as follows:

| Load: | Deformation, percent |
|---|---|
| 1.1 | 25 |
| 6.0 | 50 |
| Off scale | 60 |
| Off scale | 70 |

EXAMPLE III

Using a pad of carded 4½ denier, 4½ inch long fiber "Dacron" with the resin foam of Example I resulted in little foam formation, apparently due to the very high surface area provided by the small diameter fibers.

EXAMPLE IV

A number of pads were made according to the formulation of Example I, both fiber reinforced and without fiber. These pads ranged in nylon content by weight, of from 5 to 15% and were made in a number of thicknesses. Each pad was skived on opposite surfaces to remove imporous skin, and the skived pads were compressed to a uniform, predetermined thickness of ⅟₁₆ of an inch by pressures up to 1000 lbs./in.², and then set at the ⅟₁₆" for 1 to 2 minutes at about 350° F., thus producing sheets of various densities. Each sheet was a leather-like material pervious to water vapor (measured as grams/square meter at relative humidity of 50% at 70° F. over 24 hours) and having improved tensile strength (measured as lbs./sq. in.) as shown in the following table wherein only sample 1, used as control, was not compressed at all:

| | Initial Thickness | Water Vapor Permeability | Average Tensile Strength |
|---|---|---|---|
| Fiber Content: | | | |
| 1. None | ¼″ | 830 | 64 |
| 2. None | ¼″ | 468 | 85 |
| 3. None | ½″ | 349 | 112 |
| 4. None | ¾″ | 244 | 204 |
| 5. 5% | ¼″ | 411 | 110 |
| 9. 5% | ½″ | 332 | 240 |
| 6. 5% | ¾″ | 273 | 430 |
| 8. 10% | ¼″ | 358 | 120 |
| 7. 10% | ½″ | 280 | 330 |
| 10. 10% | ¾″ | 87 | 542 |
| 11. 15% | ¼″ | 404 | 128 |
| 12. 15% | ½″ | 194 | 343 |
| 13. 15% | ¾″ | 41 | 578 |

Fiber-containing sample sheets having the least density (i.e. compressed from ¼″ initial thickness to ⅟₁₆″ final thickness or to 4 times the initial density of the pad) all showed similar water vapor permeability, somewhat smaller than the comparable sheet without fiber. The sheets containing 5% fiber compressed to 8 times initial density showed water-vapor permeability quite similar to the comparably compressed sheet without fiber, indicating that the fiber structure, despite the low moisture regain properties of nylon, did not materially lower the permeability. Improvement of tensile strength is clearly apparent from the data, particularly in the most dense sheets.

Comparative data (QM Leather Laboratory results in gram/square meter/day, Method 8–11 of Federal Specification KK–L–311) for regular finish, standard Army upper leather (chrome side leather) at 23° C. and 50% RH, shows water vapor permeability of 200, and a high figure of 790 for regular finish, dress-oxford leather. It is apparent that the water vapor permeability of many of the sample sheets of Example IV compare quite favorably with real leather.

Since certain changes may be made in the above processes and products without departing from the scope of the invention herein involved it is intended that all matter contained in the above description or shown in the accompanying drawing shall be interpreted in an illustrative and not in a limiting sense.

What is claimed is:

1. A novel sheet material comprising a water-vapor permeable, porous sheet of polyurethane foam having a synthetic, polymeric, monofilament fiber matrix distributed therethrough with a substantially uniform distribution density, said matrix comprising a plurality of layers in each of which layers said fibers are substantially parallel and bonded to one another substantially only by said polyurethane, the fibers of each layer being disposed generally at an angle to the fibers of adjacent layers, said foam being in a fixed state of compression of less than 25% of its original state.

2. A sheet material as defined in claim 1 wherein said fibers have an average diameter in the range from about 0.001 to 0.005 inch, a length greater than about 2 inches, and a concentration by weight in the range from about 5 to about 15%.

3. A method of making sheet material and comprising the steps of forming a bat of carded loose fibers unbonded to one another;
   saturating said bat with foamable liquid urethane resin;
   foaming said resin and expanding said bat with the expansion caused by said foaming of resin; and
   setting said expanded resin and bat in foamed form;
   compressing said pad to at least 25% of its original thickness, heating the compressed pad; and
   allowing the heated, compressed bat to set at substantially its compressed thickness.

4. A method of making sheet material and comprising the steps of forming a bat of carded loose fibers unbonded to one another;

saturating said bat with foamable liquid urethane resin;

foaming said resin and expanding said bat with the expansion caused by said foaming of resin;

setting said expanded resin and bat in foamed form;

removing opposed surfaces from said pad to expose the cellular foamed structure thereof;

compressing said pad, after removal of said surfaces, to at least 25% of its original thickness;

heating the compressed pad sufficiently to cause permanent plastic deformation of the pad so that upon cooling and release of pressures, the pad will remain substantially in its compressed state and exhibit water-vapor permeability similar to leather.

5. A method of making a foamed polyurethane fiber-reinforced flexible porous pad and comprising the steps of:

forming a plurality of webs of carded, loose unbonded fibers;

stacking said webs to form a bat in which the lay of the fibers of each web is at an angle with respect to the lay of the fibers of adjacent webs;

saturating said bat with a foamable, polymerized liquid urethane composition;

foaming said composition so as to expand the distance between said fibers;

polymerizing the expanded fiber-foam structure; and crushing the polymerized fiber-foam structure to break a number of closed cell walls so as to impart intercommunication amongst some of said cells.

6. A method of making a foamed polyurethane fiber-reinforced flexible porous pad and comprising the steps of:

forming a plurality of webs of carded, loose unbonded fibers;

stacking said webs to form a bat in which the lay of the fibers of each web is at an angle with respect to the lay of the fibers of adjacent webs;

saturating said bat with a foamable, polymerized liquid urethane composition;

said fibers being synthetic polymeric monofilaments having a diameter in the range from about 0.005 to 0.02 inch, a length of greater than 2 inches, and a concentration by weight of the saturated bat in the range of 5 to 15%;

foaming said composition so as to expand the distance between said fibers; and polymerizing the expanded fiber-foam structure.

References Cited

UNITED STATES PATENTS

| | | | |
|---|---|---|---|
| 2,140,063 | 12/1938 | Talalay | 264—321 XR |
| 2,719,795 | 10/1955 | Nottebohm | 161—170 XR |
| 2,832,997 | 5/1958 | Bristol | 264—321 XR |
| 2,917,405 | 12/1959 | Gaylord | 117—140 |
| 3,004,293 | 10/1961 | Kreidl. | |
| 3,025,202 | 3/1962 | Morgan et al. | 264—47 |
| 3,042,573 | 7/1962 | Roberts | 156—285 |
| 3,068,545 | 12/1962 | Stiner | 161—170 XR |
| 3,101,292 | 8/1963 | Kine et al. | 117—140 XR |
| 3,328,198 | 6/1967 | Koller | 117—140 XR |
| 3,306,769 | 2/1967 | Hechtman | 117—119.6 |

FOREIGN PATENTS 885,084   12/1961   Great Britain.

ROBERT F. BURNETT, Primary Examiner

W. A. POWELL, Assistant Examiner

U.S. Cl. X.R.

117—140; 156—78; 161—156, 159, 170, 190; 264—45, 321